(12) United States Patent
Takiduka (10) Patent No.: US 8,806,077 B2
(45) Date of Patent: Aug. 12, 2014

(54) DATA TRANSMISSION DEVICE, DATA RECEPTION DEVICE, DATA TRANSMISSION METHOD, AND DATA RECEPTION METHOD

(75) Inventor: Hiroshi Takiduka, Tokyo (JP)

(73) Assignee: Sony Corporation (JP)

( * ) Notice: Subject to any disclaimer, the term of this patent is extended or adjusted under 35 U.S.C. 154(b) by 183 days.

(21) Appl. No.: 13/107,520

(22) Filed: May 13, 2011

(65) Prior Publication Data

US 2011/0285916 A1    Nov. 24, 2011

(30) Foreign Application Priority Data

May 21, 2010  (JP) ................ P2010-117258

(51) Int. Cl.
*G06F 3/00*   (2006.01)
*G06F 13/12*  (2006.01)
*G06F 13/38*  (2006.01)

(52) U.S. Cl.
USPC ............... 710/14; 710/10; 710/16; 710/62; 710/105; 386/200

(58) Field of Classification Search
USPC ......................................... 710/105
See application file for complete search history.

(56) References Cited

U.S. PATENT DOCUMENTS

| | | | | |
|---|---|---|---|---|
| 7,589,734 | B2 * | 9/2009 | Mawatari et al. | 345/501 |
| 7,667,706 | B2 * | 2/2010 | Mawatari et al. | 345/501 |
| 7,825,932 | B2 * | 11/2010 | Mawatari et al. | 345/501 |
| 7,937,501 | B2 * | 5/2011 | Goodart et al. | 710/2 |
| 8,090,030 | B2 * | 1/2012 | Kim et al. | 375/240.28 |
| 8,176,214 | B2 * | 5/2012 | Jones et al. | 710/14 |
| 8,275,232 | B2 * | 9/2012 | Chen et al. | 386/200 |
| 2003/0214507 | A1 * | 11/2003 | Mawatari et al. | 345/530 |
| 2007/0291938 | A1 * | 12/2007 | Rao et al. | 380/210 |
| 2008/0084834 | A1 * | 4/2008 | Stanek | 370/284 |
| 2008/0205855 | A1 * | 8/2008 | Takamori | 386/123 |
| 2009/0178097 | A1 * | 7/2009 | Kim et al. | 725/114 |
| 2009/0278984 | A1 * | 11/2009 | Suzuki et al. | 348/554 |
| 2009/0317059 | A1 * | 12/2009 | Chen et al. | 386/95 |
| 2010/0182503 | A1 * | 7/2010 | Kim et al. | 348/479 |
| 2011/0141351 | A1 * | 6/2011 | Yan | 348/445 |
| 2011/0170011 | A1 * | 7/2011 | Choi et al. | 348/725 |
| 2011/0310070 | A1 * | 12/2011 | Zeng et al. | 345/204 |
| 2012/0131245 | A1 * | 5/2012 | Wilcox | 710/106 |

OTHER PUBLICATIONS

High-Definition Multimedia Interface Specification Version 1.4, Jun. 5, 2009; pp. i-197; Supplement 1—Consumer Electronics Control (CEC), pp. CEC i-CEC 127; Supplement 2—HDMI Ethernet and Audio Return Channel (HEAC), pp. HEAC 1-HEAC 72.

* cited by examiner

*Primary Examiner* — Ryan Stiglic
(74) *Attorney, Agent, or Firm* — Lerner, David, Littenberg, Krumholz & Mentlik, LLP (57) ABSTRACT

There is provided a data transmission device including an acquisition unit which acquires identification information indicating whether or not a data reception device operating by a first digital interface is compatible with a second digital interface other than the first digital interface, which is stored in a storing unit of the data reception device, via the first digital interface of the data reception device and the second digital interface of the data transmission device operating by the second digital interface, and a distinction unit which distinguishes whether or not the data reception device is compatible with the second digital interface, based on the identification information acquired by the acquisition unit.

8 Claims, 7 Drawing Sheets

HDMI PIN ASSIGNMENT (IN CASE OF TYPE-A)

| PIN | Signal Assignment |
|---|---|
| 1 | TMDS Data2+ |
| 3 | TMDS Data2- |
| 5 | TMDS Data1 Shield |
| 7 | TMDS Data0+ |
| 9 | TMDS Data0- |
| 11 | TMDS Clock Shield |
| 13 | CEC |
| 15 | SCL |
| 17 | DDC/CEC Ground / HEAC Shield |
| 19 | Hot Plug Detect / HEAC- |

| PIN | Signal Assignment |
|---|---|
| 2 | TMDS Data2 Shield |
| 4 | TMDS Data1+ |
| 6 | TMDS Data1- |
| 8 | TMDS Data0 Shield |
| 10 | TMDS Clock+ |
| 12 | TMDS Clock- |
| 14 | Utility/HEAC+ |
| 16 | SDA |
| 18 | +5V Power |

MHL VSDB (Vendor Specific Data Block)

| Byte# | 7 | 6 | 5 | 4 | 3 | 2 | 1 | 0 |
|---|---|---|---|---|---|---|---|---|
| 0 | Vendor-specfic tag code (=3) | | | | Length (=N) | | | |
| 1 | 24-bit IEEE Registration Identifier (MHL) (least significant byte first) | | | | | | | |
| 2 | | | | | | | | |
| 3 | | | | | | | | |
| ...N | Reserved (0) | | | | | | | |

DATA TRANSMISSION DEVICE, DATA RECEPTION DEVICE, DATA TRANSMISSION METHOD, AND DATA RECEPTION METHOD

CROSS-REFERENCE TO RELATED APPLICATION

The present application claims priority from Japanese Patent Application No. JP 2010-117258 filed in the Japanese Patent Office on May 21, 2010, the entire content of which is incorporated herein by reference.

BACKGROUND OF THE INVENTION

1. Field of the Invention

The present invention relates to a data transmission device, a data reception device, a data transmission method, and a data reception method.

2. Description of the Related Art

In recent years, a digital interface such as a High Definition Multimedia Interface (HDMI) has become widespread as a communication interface via which image or voice data is transmitted at a high speed from a source device to a sync device. As a source device, there are given, for example, a game player, a Digital Versatile Disc (DVD) recorder, a set-top box, and other Audio Visual (AV) sources. As a sync device, there are given, for example, a television set, a projector, and other displays. The EDMI standard is described in details in High-Definition Multimedia Interface Specification Version 1.4, Jun. 5, 2009, for example.

SUMMARY OF THE INVENTION

In the EDMI standard, it is principally assumed that between fixed devices is connected. For this reason, the number of pins of a connector is large, namely, 19, and outside dimension of the connector is also large, so that the EDMI standard disadvantages a potable device. Accordingly, it has begun to make a connector smaller, by providing the same with a small number of pins, and to consider a standard in which baseband video transmission equivalent to that performed by the EDMI is performed between one device and the other device.

Against this background, as a new standard, Mobile High-definition Link (MHL) standard is proposed. The MHL standard is an interface standard for high-speed transmission of video, which is intended for a portable device.

Incidentally, a source device supporting the MHL standard distinguished whether or not a sync device supported the MHL standard, by exchanging with the sync device signals generated dedicated hardware, such as a level and a pulse string.

However, when distinction whether or not the sync device supported the MHL standard was realized by dedicated hardware, there arose issues with cost and compatibility between the source device and the sync device.

In light of the foregoing, it is desirable to provide a data transmission device, a data reception device, a data transmission method, and a data reception method, which are novel and improved, and which are capable of avoiding issues with cost and compatibility between the source device and the sync device, in distinguishing whether or not the MHL standard is supported.

According to an embodiment of the present invention, there is provided a data transmission device including a acquisition unit which acquires identification information indicating whether or not a data reception device operating by a first digital interface is compatible with a second digital interface other than the first digital interface, which is stored in a storing unit of the data reception device, via the first digital interface of the data reception device and the second digital interface of the data transmission device operating by the second digital interface, and a distinction unit which distinguishes whether or not the data reception device is compatible with the second digital interface, based on the identification information acquired by the acquisition unit.

The identification information may be Enhanced Extended Display Identification Data (E-EDID) stored in the storing unit.

The distinction unit may distinguish whether or not the data reception device is compatible with the second digital interface, based on a Vendor Specific Data Block (VSDB) described in the E-EDID.

The first digital interface may be an interface according to High Definition Multimedia Interface (EDMI) standard. The second digital interface may be an interface according to Mobile High-definition Link (MHL) standard.

According to another embodiment of the present invention, there is provided a data reception device including a storing unit which stores identification information indicates whether or not the data reception device operating by a first digital interface is compatible with a second digital interface other than the first interface, the identification information being acquired by a data transmission device operating by the second digital interface via the first digital interface and the second interface.

The identification information may be Enhanced Extended Display Identification Data (E-EDID).

The first digital interface may be an interface according to High Definition Multimedia Interface (EDMI) standard. The second digital interface may be an interface according to Mobile High-definition Link (MHL) standard.

According to another embodiment of the present invention, there is provided a data transmission method, including the steps of acquiring identification information indicating whether or not a data reception device operating by a first digital interface is compatible with a second digital interface other than the first digital interface, which is stored in a storing unit of the data reception device, via the first digital interface of the data reception device and the second digital interface of a data transmission device operating by the second digital interface, and distinguishing whether or not the data reception device is compatible with the second digital interface, based on the identification information acquired in the step of acquiring.

According to another embodiment of the present invention, there is provided a data reception method including the step of causing a storing unit of a data reception device operating by a first digital interface to store identification information indicating whether or not the data reception device is compatible with a second digital interface other than the first interface, the identification information being acquired by a data transmission device operating by the second digital interface via the first digital interface and the second digital interface.

According to the embodiments of the present invention described above, it is possible to avoid issues with cost and compatibility between the source device and the sync device, in distinguishing whether or not the MHL standard is supported.

DETAILED DESCRIPTION OF THE EMBODIMENTS

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Explanation will be made in the following order.
1. Configuration of AV system
2. Configuration examples of data transmission unit and of data reception unit (HDMI standard)
3. Configuration examples of data transmission unit and of data reception unit (MHL standard)
4. Structure of MHL VSDB described in E-EDID
5. Process of distinguishing whether MHL standard is supported

[1. Configuration of AV System]

Figure 1:
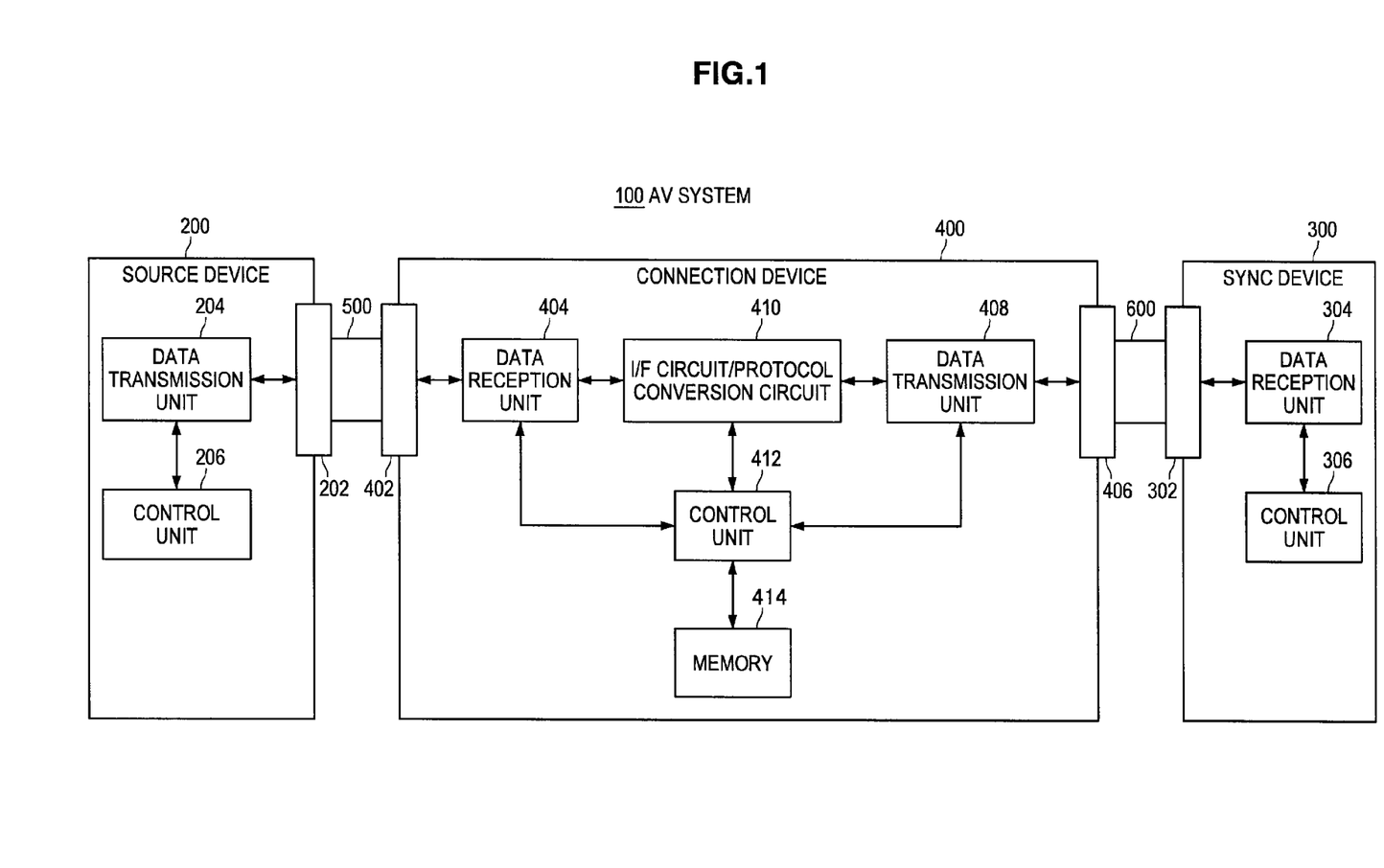
FIG. 1 is a block diagram schematically illustrating a configuration of an AV system according to an embodiment of the present invention.

First, an Audio and Visual (AV) system according to an embodiment of the present invention will be explained. FIG. 1 is a block diagram schematically illustrating a configuration of the AV system according to the present embodiment.

In FIG. 1, the AV system 100 includes a source device 200, a sync device 300, and a connection device 400. The source device 200 is an AV source such as a mobile phone, a game player, and a digital camera. The sync device 300 is, for example, a television set, or a projector. The connection device 400 is a device, referred as to a dongle, which performs interface conversion.

The source device 200 and the connection device 400 are connected via a cable 500 with each other. A connector unit 202, to which a data transmission unit 204 is connected, is included in the source device 200. A connector unit 402, to which a data reception unit 404 is connected, is included in the connection device 400. An end of the cable 500 is connected to the connector unit 202 of the source device 200 while another end of the cable 500 is connected to the connector unit 402 of the connection device 400.

The source device 200 has a control unit 206. The control unit 206 is an example of an acquisition unit and of a distinction unit of the present invention. This control unit 206 controls the entire source device 200. The data transmission unit 204 of the source device 200 supports a digital interface according to the MHL standard. Namely, the source device 200 operates by the interface according to the MHL standard.

The data reception unit 404 of the connection device 400 supports the digital interface according to the MHL standard.

The connection device 400 and the sync device 300 are connected via a cable 600 with each other. A connector unit 406, to which a data transmission unit 408 is connected, is included in the connection device 400. A connector unit 302, to which a data reception unit 304 is connected, is included in the sync device 300. An end of the cable 600 is connected to the connector unit 406 of the connection device 400 while another end of the cable 600 is connected to the connector unit 302 of the sync device 300.

The sync device 300 has a control unit 306. This control unit 306 controls the entire sync device 300. The data reception unit 304 of the sync device 300 supports a digital interface according to the EDMI standard. Namely, the sync device 300 operates by the interface according to the EDMI standard. The data transmission unit 408 of the connection device 400 supports a digital interface according to the EDMI standard.

The connection device 400 has an I/F circuit/protocol conversion circuit 410. The data reception unit 404 and the data transmission unit 408 are connected via the I/F circuit/protocol conversion circuit 410. The I/F circuit/protocol conversion circuit 410 performs protocol processing on data received by the data reception unit 404, according to control by the control unit 412.

The connection device 400 has a control unit 412. This control unit 412 controls the entire connection device 400. Further, the connection device 400 has a memory 414.

In the present embodiment, when the connection device 400 and the sync device 300 are connected with each other, the control unit 412 of the connection device 400 reads out E-EDID which will be described later, from the data reception unit 304 of the sync device 300, by controlling the data transmission unit 408. Further, the control unit 412 distinguishes, based on the read-out E-EDID, whether or not the sync device 300 supports the MHL standard. The control unit 412 causes the memory 414 to store distinction results on whether or not the sync device 300 supports the MHL standard. The control unit 412 controls the I/F circuit/protocol conversion circuit 412 based on the distinction results on whether or not the MHL standard is supported, the results being stored in the memory 414.

In the present embodiment, for example, when the sync device 300 supports the MHL standard, the connection device 400 conducts communications by transmitting to the sync device 300 signals of MHL protocol as they are, according to control by the control unit 412. Further, when the sync device 300 does not support the MHL standard, the connection device 400 conducts communications by filtering signals of MHL protocol in such a manner that the signals are adjusted to a band of the EDMI standard and by transmitting the filtered signals to the sync device 300, according to control by the control unit 412.

Moreover, in the present embodiment, for example, when the sync device 300 supports the MHL standard, the connection device 400 performs protocol processing according to control by the control unit 412, regarding the sync device 300 as a MHL-compatible device. Further, when the sync device 300 does not support the MHL standard, the connection device 400 intermediates between the source device 200 and the sync device 300 according to control by the control unit 412, such that processing which is limited to the MHL functions among the EDMI functions may be performed. For example, the ability of the EDMI standard, which is described in the E-EDID but which cannot be supported by the MHL standard, is masked, namely, the ability is set to 0, and is transmitted to the sync device 300.

Further, in the present embodiment, when the source device 200 and the connection device 400 are connected with each other, the control unit 206 of the source device 200 reads out from the memory 414 of the connection device 400 distinction results on whether or not the sync device 300 supports the MHL standard, by controlling the data transmission unit 204. Then, the control unit 206 recognizes whether or not the sync device 300 supports the MHL standard, based on the read-out distinction results. Besides, the control unit 206 may read out E-EDID which was read out by the control unit 412 of the connection device 400, by controlling the data transmission unit 204, and may distinguish whether or not the sync device 300 supports the MHL standard, based on the read-out E-EDID.

[2. Configuration Examples of Data Transmission Unit and of Data Reception Unit (HDMI Standard)]

Figure 2:
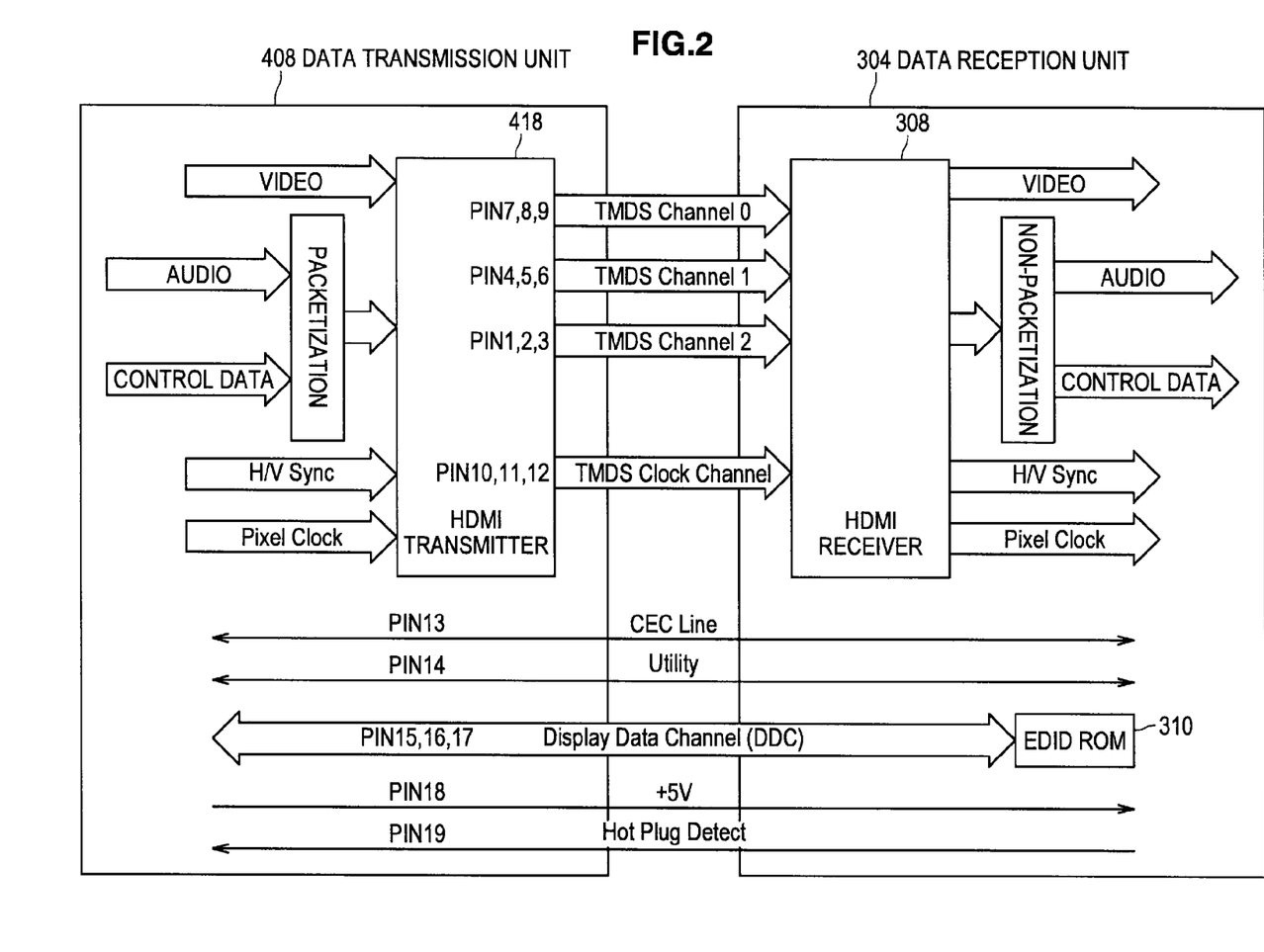
FIG. 2 is an explanatory diagram schematically illustrating configuration examples of a data transmission unit of a connection device and of a data reception unit of a sync device in the AV system of FIG. 1, respectively.

Next, the data transmission unit 408 of the connection device 400 and the data reception unit 304 of the sync device 300 in the AV system 100 of FIG. 1 will be explained. FIG. 2 is an explanatory diagram schematically illustrating configuration examples of the data transmission unit 408 of the connection device 400 and of the data reception unit 304 of the sync device 300 in the AV system 100 of FIG. 1, respectively. In these configuration examples, a case where a digital interface between the data transmission unit 408 and the data reception unit 304 is a digital interface according to the HDMI standard.

The data transmission unit 408 transmits differential signals related to pixel data constituting an uncompressed image for one frame, unidirectionally to the data reception unit 304 on multiple channels, in a valid image interval (hereafter, appropriately referred to also as an active video interval). Here, a valid image interval is an interval in which a horizontal blanking interval and a vertical blanking interval are excluded from an interval from a vertical synchronization signal to the next vertical synchronization signal. Further, the data transmission unit 408 transmits differential signals related to, at least, voice data associated with the image, control data, other auxiliary data, or the like, unidirectionally to the data reception unit 304 on multiple channels, in a horizontal blanking interval or in a vertical blanking interval.

As transmission channels for a EDMI system including the data transmission unit 408 and the data reception unit 304, there are given following transmission channels. That is, there are three TMDS channels #0-#2, each as a transmission channel for unidirectionally, serially transmitting pixel data and voice data from the data transmission unit 408 to the data reception unit 304, with the pixel data and the voice being synchronized with a pixel clock. Further, there is given a TMDS clock channel as a transmission channel for transmitting a TMDS clock.

The data transmission unit 408 has a EDMI transmitter 418. For example, this EDMI transmitter 418 converts pixel data constituting an uncompressed image into corresponding differential signals, and unidirectionally, serially transmits the same to the data reception unit 304 which is connected with the data transmission unit 408 via a EDMI cable, on three TMDS channel #0, #1, and #2, which are multiple channels.

Further, the EDMI transmitter 418 converts voice data associated with the uncompressed image, necessary control data, other auxiliary data, and the like, into corresponding signals, and unidirectionaly, serially transmits the same to the data reception unit 304 on three TMDS channel #0, #1, and #2.

Furthermore, the EDMI transmitter 418 transmits to the data reception unit 304 which is connected with the data transmission unit 408 via a EDMI cable, on the TMDS clock channel, TMDS clocks which are synchronized with pixel data to be transmitted on three TMDS channels #0, #1, and #2. Here, 10 bits of data is transmitted on one TMDS channel #i (i=0, 1, 2), during one TMDS clock.

The data reception unit 304 receives differential signals related to pixel data, which are unidirectionally transmitted from the data transmission unit 408 on multiple channels in an active video interval. Further, this data reception unit 304 receives differential signals related to voice data and control data, which are unidirectionally transmitted from the data transmission unit 408 on multiple channels in a horizontal blanking interval or in a vertical blanking interval.

Namely, the data reception unit 304 has a EDMI receiver 308. This EDMI receiver 308 receives differential signals related to pixel data, which are unidirectionally transmitted from the data transmission unit 408 on the TMDS channels #0, #1, and #2, and differential signals related to voice data and control data. In this case, the data reception unit 304 receives the signals, while being synchronized with a pixel clock (a TMDS clock), which is transmitted from the data transmission unit 408 on the TMDS clock channel.

As a transmission channel for the EDMI system, there are given transmission channels, referred to as a Display Data Channel (DDC) and a CEC line, respectively, in addition to the TMDS channels #0-#2 and the TMDS clock channel described above. The DDC includes two signal lines (not shown) included in a EDMI cable. The DDC is used in order for the data transmission unit 408 to read out from the data reception unit 304 Enhanced Extended Display Identification Data (E-EDID).

Namely, the data reception unit 304 has, in addition to the EDMI receiver 308, an EDID ROM (Read Only Memory) 310 storing E-EDID which is performance information related to performance (configuration/capability) of the data reception unit 304 itself. The EDID ROM 310 is an example of a storing unit of the present invention. The data transmission unit 408 reads out, via the DDC, the E-EDID from the data reception unit 304 which is connected with the data transmission unit 408 via a HDMI cable, in response to a request from the control unit 412, for example.

The data transmission unit 408 transmits the E-EDID, which it read out, to the control unit 412. The control unit 412 stores the E-EDID in a flash ROM or a DRAM (both not shown). The control unit 412 can recognize, based on the E-EDID, setting of performance of the data reception unit 304, or can recognize whether or not the sync device 300 has the ability to support the MHL standard. For example, the control unit 412 recognizes whether or not the sync device 300, which has the data reception unit 304, has the ability to support the MHL standard. For example, the control unit 412 recognizes whether or not the sync device 300, which has the data reception unit 304, can handle three-dimensional image data, and if the sync device 300 can handle three-dimensional image data, the control unit 412 further recognizes what kind of TMDS transmission data structure the sync device 300 can support, and the like.

The CEC line includes one signal line (not shown) included in a EDMI cable, and is used in order to bidirectionally communicate control data between the data transmission unit 408 and the data reception unit 304. The CEC line constitutes a control data line.

Further, a line (a HPD line) which is connected to a pin referred to as Hot Plug Detect (HPD) is included in a EDMI cable. By this HPD line, a connection device can detect a sync device being connected thereto. Besides, this HPD line is used also as a HEAC− line which constitutes a bidirectional communication path. Further, a power line (+5V Power Line) used to supply power from a source device to a sync device is included in the EDMI cable. Further, a utility line is included in the EDMI cable. This utility line is used also as a HEAC+ line which constitutes a bidirectional communication path.

Figure 3:
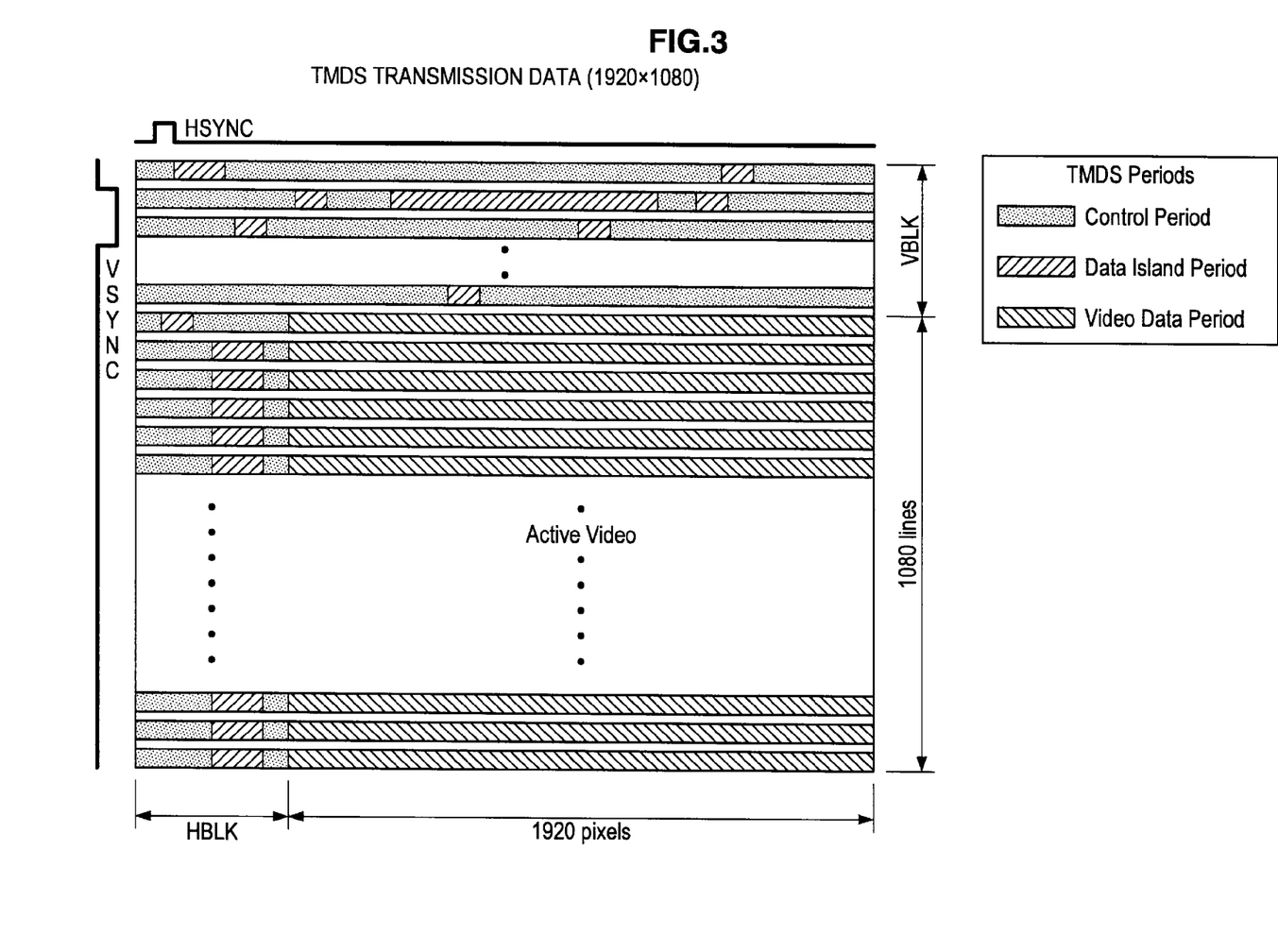
FIG. 3 is an explanatory diagram illustrating a structure example of TMDS transmission data.

FIG. 3 is an explanatory diagram illustrating a structure example of TMDS transmission data. FIG. 3 shows intervals for various types of transmission data in a case where image data being 1920 pixels by 1080 lines is transmitted on the TMDS channels #0, #1, and #2.

In a Video Field in which transmission data is transmitted on three TMDS channels #0, #1, and #2 for the HDMI system, there are three types of intervals in accordance with types of transmission data. As these three types of intervals, there are given a video data interval (a Video Data period), a Data Island interval (a Data Island period), and a Control interval (a Control period).

Here, the Video Field interval is an interval from a rising edge (an active edge) of a vertical synchronization signal to a rising edge of the next vertical synchronization signal. This Video Field interval is subdivided into a horizontal blanking period (horizontal blanking), a vertical blanking period (vertical blanking), and an Active Video interval (Active Video). This Active Video interval is an interval in which the horizontal blanking period and the vertical blanking period are excluded from the video field interval.

The Video Data interval is allocated to the Active Video interval. In this Video Data interval, data of valid pixels (Active pixels) which constitute uncompressed image data for one frame of 1920 pixels×1080 lines is transmitted.

A Data Island interval and a Control interval are allocated to the horizontal blanking period and the vertical blanking period. In these Data Island interval and Control interval, Auxiliary data is transmitted. Namely, the Data Island interval is allocated to a part of the horizontal blanking period and of the vertical blanking period. In this Data Island period, control-irrelevant data of the Auxiliary data, for example, a packet for voice data is transmitted.

The Control interval is allocated to another part of the horizontal blanking period and of the vertical blanking period. In this Control interval, control-relevant data of the Auxiliary data, for example, a vertical synchronization signal as well as a horizontal synchronization signal, and a control packet are transmitted.

Figure 4:
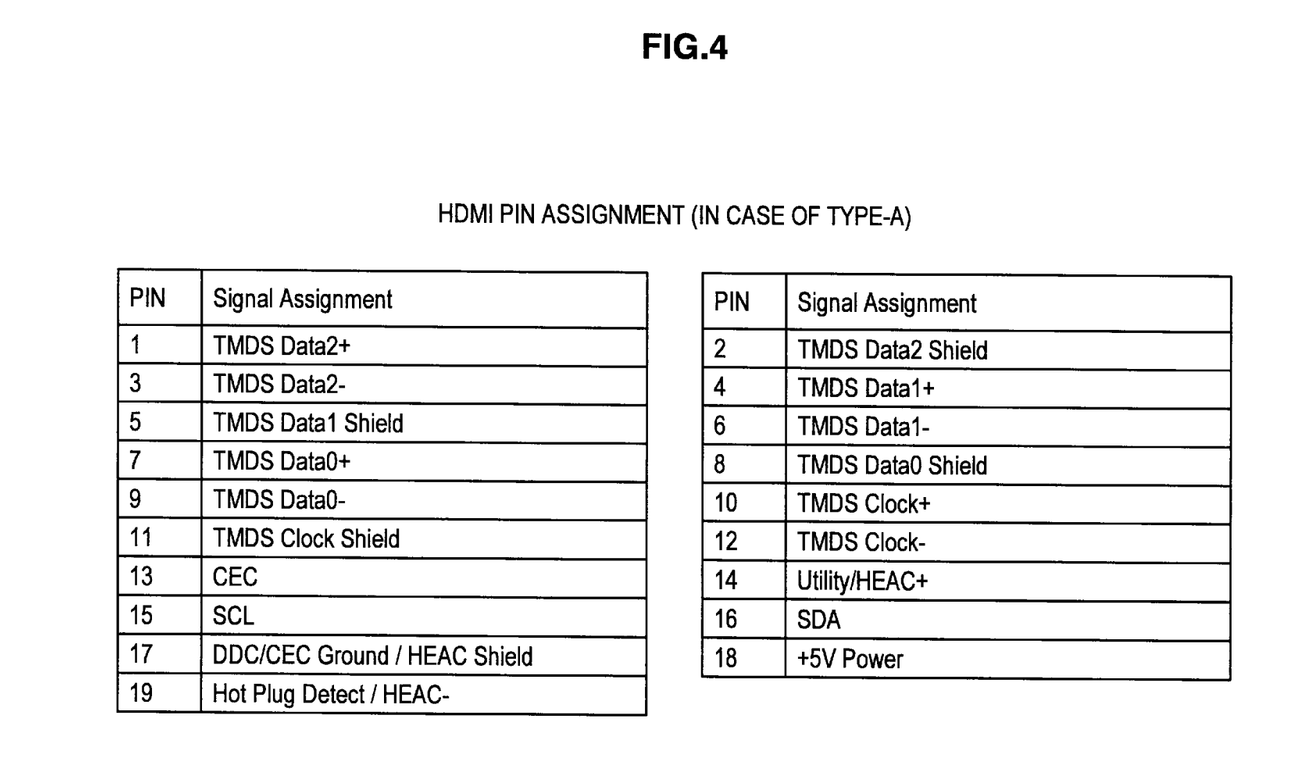
FIG. 4 is an explanatory diagram illustrating an example of pin assignment for a EDMI receptacle.

FIG. 4 is an explanatory diagram illustrating an example of pin assignment for a EDMI receptacle. Pin assignment shown in FIG. 4 is referred as to type-A. TMDS Data #i+ and TMDS Data #i−, which are differential signals of the TMDS channel #i, are transmitted by two lines which are differential lines. These two lines are connected to pins (whose pin number are 1, 4, and 7, respectively), to which the TMDS Data #i+ is allocated, and pins (whose pin number are 3, 6, and 9, respectively), to which the TMDS Data #i− is allocated.

Further, the CEC line, via which a CEC signal which is control data is transmitted, is connected to a pin whose pin number is 13. Further, a line, via which a Serial Data (SDA) signal such as E-EDID is transmitted, is connected to a pin whose pin number is 16. A line, via which a Serial Clock (SCL) signal, that is, a clock signal used for synchronization at the time of transmitting/receiving the SDA signal is transmitted, is connected to a pin whose pin number is 15. The above DDC includes the line via which a SDA signal is transmitted and the line via which a SCL signal is transmitted.

Further, as described above, the HPD line (a HEAC− line), by which a connection device detects a sync device being connected thereto, is connected to a pin whose pin number is 19. Further, the utility line (a HEAC+ line) is connected to a pin whose number is 14. Further, as described above, a power line for supplying power is connected to a pin whose pin number is 18.

[3. Configuration Examples of Data Transmission Unit and of Data Reception Unit (MHL Standard)]

Figure 5:
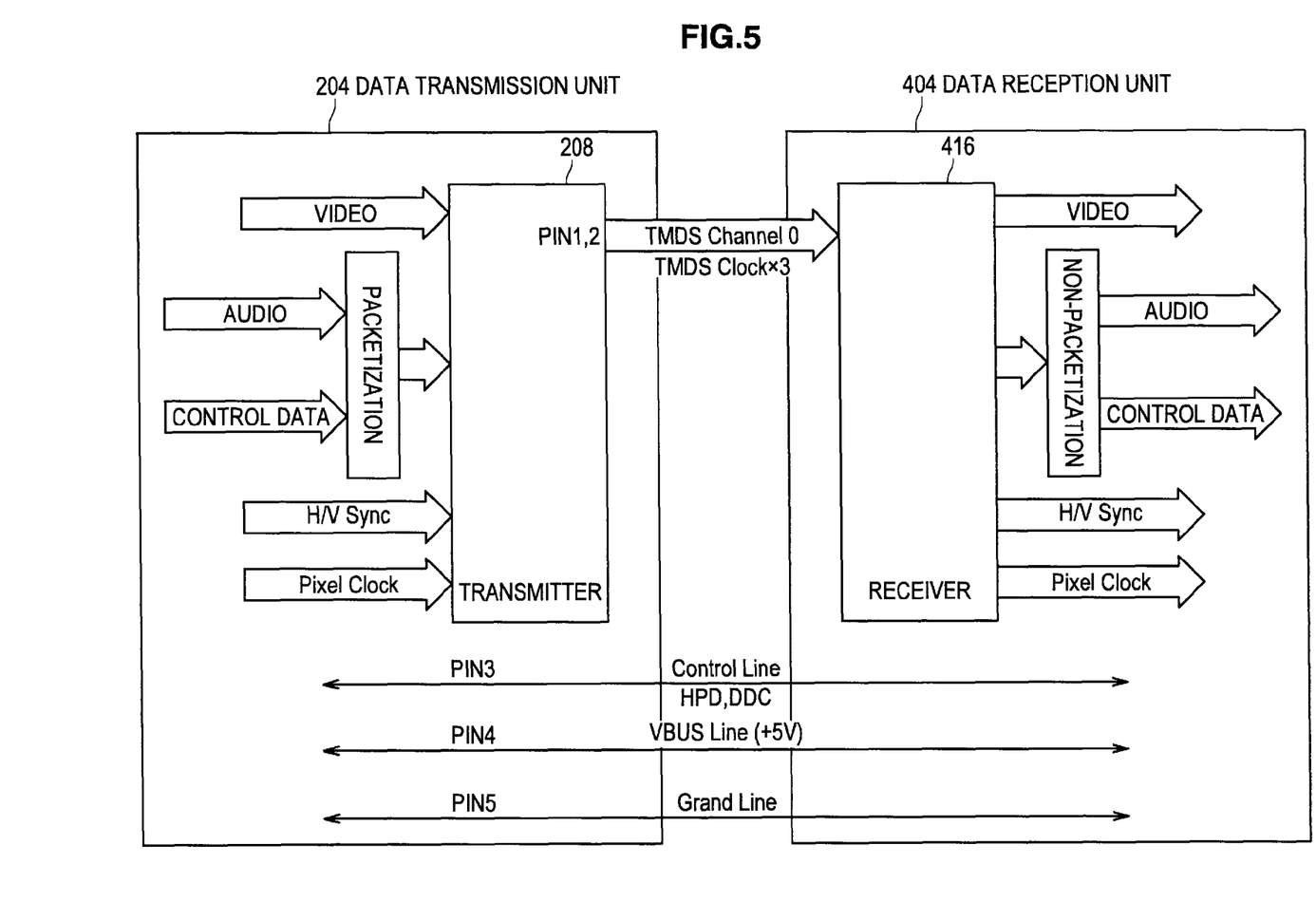
FIG. 5 is an explanatory diagram schematically illustrating configuration examples of a data transmission unit of a source device and of a data reception unit of the connection device in the AV system of FIG. 1, respectively.

Next, the data transmission unit 204 of the source device 200 and the data reception unit 404 of the connection device 400 in the AV system 100 of FIG. 1 will be explained. FIG. 5 is an explanatory diagram schematically illustrating configuration examples of the data transmission unit 204 of the source device 200 and of the data reception unit 404 of the connection device 400 in the AV system 100 of FIG. 1, respectively. In these configuration examples, a case where a digital interface between the data transmission unit 204 and the data reception unit 404 is a digital interface according to the MHL standard. In FIG. 5, detailed explanation of elements corresponding to those in FIG. 2 will be appropriately omitted.

The data transmission unit 204 transmits differential signals related to pixel data constituting an uncompressed image for one frame, unidirectionally to the data reception unit 404 on a single channel #0, in a valid image interval (hereafter, appropriately referred to also as an active video interval). Here, a valid image interval is an interval in which a horizontal blanking interval and a vertical blanking interval are excluded from an interval from a vertical synchronization signal to the next vertical synchronization signal. Further, the data transmission unit 204 transmits differential signals related to, at least, voice data associated with the image, control data, other auxiliary data, or the like, unidirectionally to the data reception unit 404 on the single channel #0, in a horizontal blanking interval or in a vertical blanking interval.

In this case, transmission of the above data exclusively on the TMDS channel #0 is made possible, by transmitting three times as many TMDS clocks as those in case of the EDMI standard (see FIG. 2). Further, the TMDS clocks themselves are also inserted into the TMDS channel #0 in a common mode, thereby not needing a TMDS clock channel. For this reason, in this digital interface according to the MHL standard, 2 pins for a HDMI receptacle, PINs 1 and 2, are used.

The data transmission unit 204 has a transmitter 208. For example, this transmitter 208 converts pixel data constituting an uncompressed image into corresponding differential signals, and unidirectionally, serially transmits the same to the data reception unit 404 connected with the data transmission unit 204 via a MHL cable, on the single TMDS channel #0.

Further, the transmitter 208 converts voice data associated with the uncompressed image, necessary control data, other auxiliary data, and the like, into corresponding signals, and unidirectionally, serially transmits the same to the data reception unit 404 on the single TMDS channel #0.

The data reception unit 404 receives differential signals related to pixel data, which are unidirectionally transmitted from the data transmission unit 204 on the single channel #0 in an active video interval. Further, this data reception unit 404 receives differential signals related to voice data and control data, which are unidirectionally transmitted from the data transmission unit 204 on the single channel #0 in a horizontal blanking interval or in a vertical blanking interval.

Namely, the data reception unit 404 has a receiver 416. This receiver 416 receives differential signals related to pixel data, which are unidirectionally transmitted from the data transmission unit 204 on the TMDS channel #0, and differential signals related to voice data and control data.

Furthermore, in the configuration examples of FIG. 5, a single Control Line (CRUS) is used as a line which represents the CEC line, the DDC, and the HPD line. The data transmission unit 204 reads out via the control line, from a memory of the connection device 400 connected with the data transmission unit 204 via a MHL cable, distinction results on whether or not the sync device 300 supports the MHL standard, in response to a request from the control unit 206, for example. Further, the data transmission unit 204 may read out via the control line E-EDID which was read out by the control unit 412 of the connection device 400 connected with the data transmission unit 204 via a MHL cable, in response to a request from the control unit 206, for example. Furthermore, a power line (a+5V power line) is omitted. Moreover, a VBUS line for charge of a portable source device, such as a USB, is added, and a Grand Line is also provided, which is shared by the above lines.

The control line is connected to a pin whose pin number is 3. Further, the VBUS line is connected to a pin whose pin number is 4. Furthermore, the Grand line is connected to a pin whose pin number is 5. For this reason, in the digital interface according to the MHL standard shown in FIG. 5, 14 pins of the pins for a EDMI receptacle (Type A), PINs 6-19, are not used.

Other elements in the configuration examples of the data transmission unit 204 and the data reception unit 404 in case of the MHL standard shown in FIG. 5 are the same as those in the configuration examples of the data transmission unit 408 and of the data reception unit 304 in case of the EDMI standard shown in FIG. 2, and detailed explanation thereof will be accordingly omitted.

[4. Structure of MHL VSDB Described in E-EDID]

Figure 6:
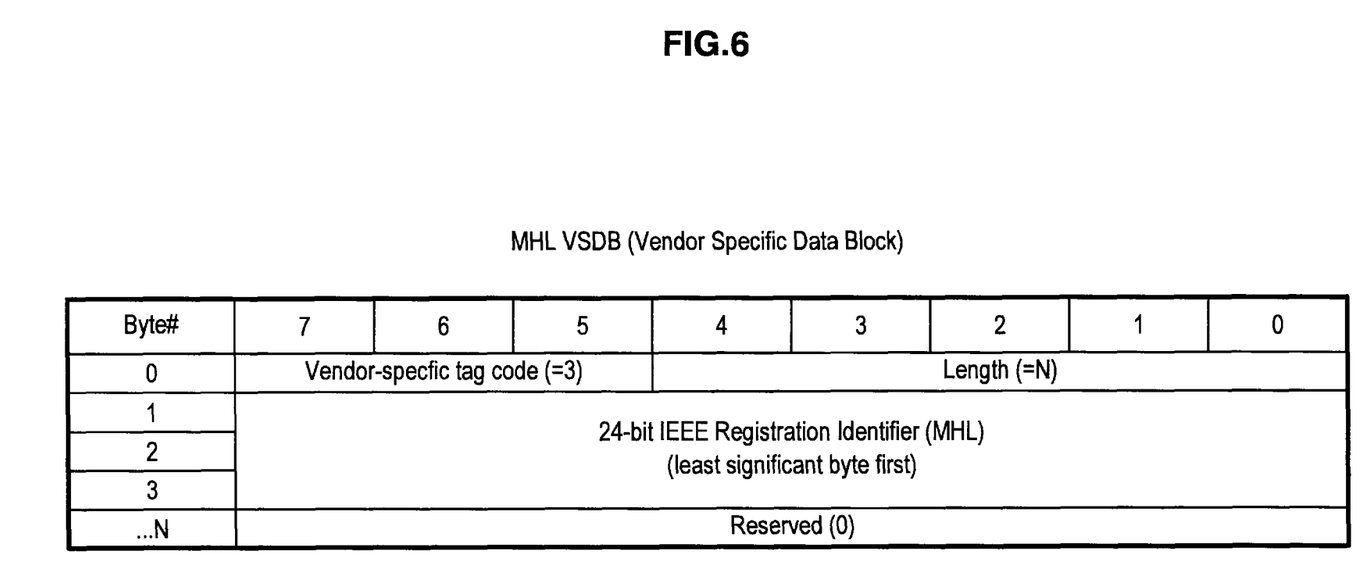
FIG. 6 is an explanatory diagram illustrating structure of a MHL VSDB described in E-EDID stored in an EDID ROM of the sync device in FIG. 1.

Next, Structure of a MHL VSDB described in E-EDID stored in an EDID ROM 310 of the sync device 300 in FIG. 1 will be explained. FIG. 6 is an explanatory diagram illustrating structure of a MHL VSDB described in E-EDID stored in an EDID ROM 310 of the sync device 300 in FIG. 1.

In FIG. 6, in a MHL VSDB (Vendor Specific Data Block), bits 7-5 of Byte #0 are set to 3 indicating that a CEA Data Block is a Vendor Specific Data Block. Further, in the MHL VSDB, bits 4-0 of Byte #0 are set to a 5-bit Length indicating the length of the corresponding Data Block. However, the length of Byte #0 is not counted in Length. Furthermore, in the MHL VSDB, Bytes #1-3 are set to a 24-bit IEEE Registration Identifier indicating an OUI (Organizationally Unique Identifier) of the MHL standard.

[5. Process of Distinguishing Whether MHL Standard is Supported]

Figure 7:
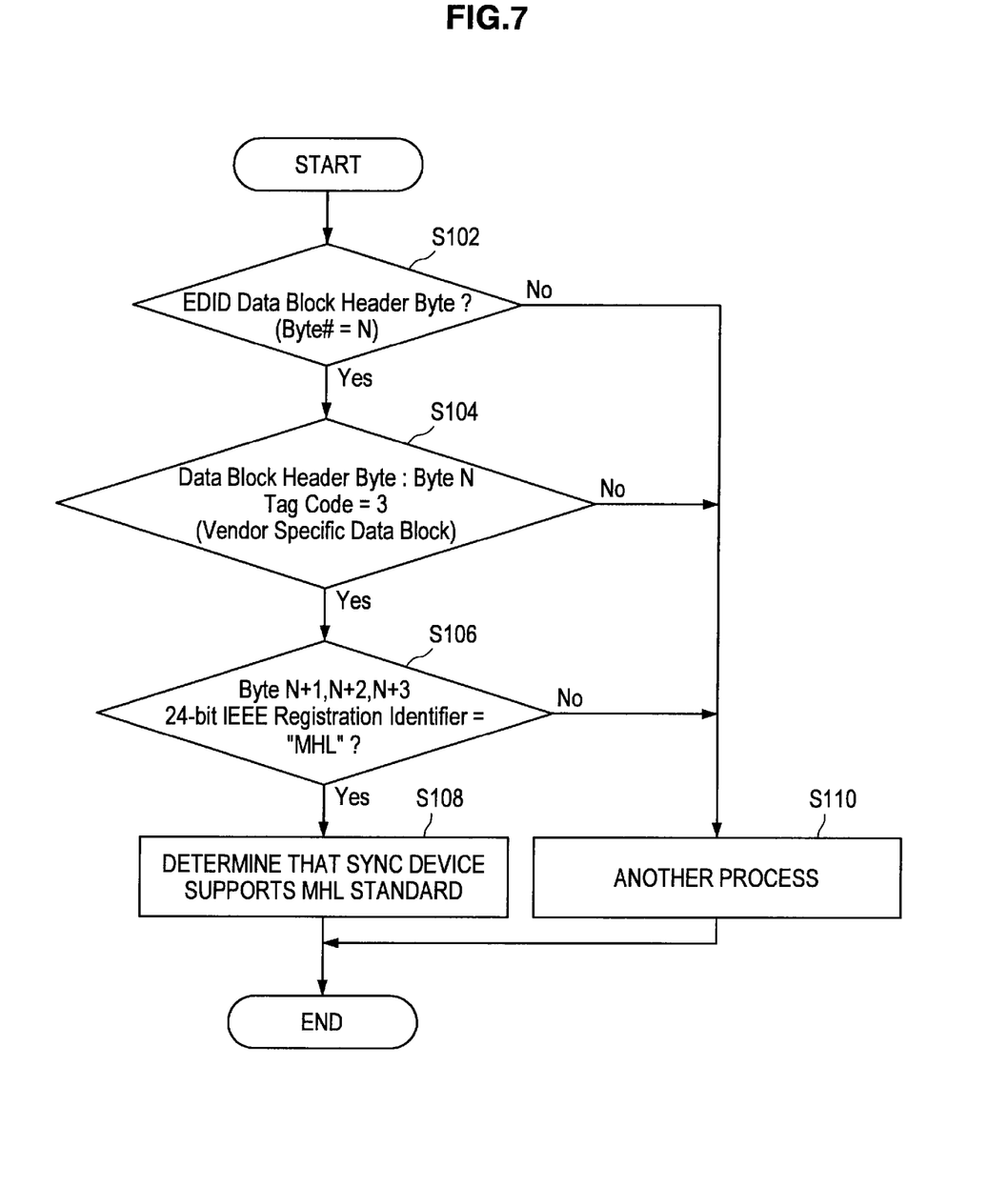
FIG. 7 is a flow chart for a process of distinguishing whether MHL standard is supported, which is performed by a control unit of the source device in FIG. 1.

Next, a process of distinguishing whether the MHL standard is supported will be explained, which is performed by the control unit 206 of the source device 200 or the control unit 412 of the connection device 400 in FIG. 1. The process of distinguishing whether the MHL standard is supported, which is performed by the control unit 206 of the source device 200, and the process of distinguishing whether the MHL standard is supported, which is performed by the control unit 412 of the connection device 400 are basically the same. Accordingly, the process of distinguishing whether the MHL standard is supported, which is performed by the control unit 206 of the source device 200 will be explained hereafter. FIG. 7 is a flow chart for the process of distinguishing whether the MHL standard is supported, which is performed by the control unit 206 of the source device 200 in FIG. 1.

In FIG. 7, first, the control unit 206 of the source device 200 reads out E-EDID which was read out by the control unit 412 of the connection device 400 from the EDID ROM 310 of the sync device 300, by controlling the data transmission unit 204, and distinguishes whether or not it is a EDID Data Block Header Byte (step S102).

When, as a result of the distinction in the step S102, it is a EDID Data Block Header Byte (in case of YES in the step S102), the control unit 206 distinguishes whether or not the Vendor-specific tag code of bits 7-5 of the Data Block Header Byte is 3 (step S104). Besides, Byte # of the EDID Data Block Header Byte is set to N.

When, as a result of the distinction in the step S104, the Vendor-specific tag code is 3 (in case of YES in the step S104), the control unit 206 distinguishes whether or not the 24-bit IEEE Registration Identifier indicates the MHL standard (step S106).

When, as a result of the distinction in the step S106, the 24-bit IEEE Registration Identifier indicates the MHL standard (in case of YES in the step S106), the control unit 206 determines that the sync device 300 supports the MHL standard (step S108), so that the present process is terminated.

On the other hand, when, as a result of the distinction in the step S102, it is not a EDID Data Block Header Byte (in case of NO in the step S102), when, as a result of the distinction in the step S104, the Vendor-specific tag code is not 3 (in case of NO in the step S104), or when, as a result of the distinction in the step S106, the 24-bit IEEE Registration Identifier does not indicate the MHL standard (in case of NO in the step S106), the control unit 206 performs another process, for example, a process of determining that the sync device 300 does not support the MHL standard (step S110), so that the present process is terminated.

According to the process of distinguishing whether the MHL standard is supported in FIG. 7, the control unit 206 of the source device 200 reads out E-EDID which is stored in the EDID ROM 310 of the sync device 300, and performs distinction whether or not the sync device 300 supports the MHL standard. Accordingly, there is no need to perform distinction whether or not the sync device 300 supports the MHL standard, by exchanging with the source device 200 and the sync device 300 signals generated by dedicated hardware, such as a level and a pulse string. Thereby, it is possible to avoid issues with cost and compatibility between the source device and the sync device, which arose in a case where distinction whether or not the sync device 300 supports the MHL standard was realized by dedicated hardware.

Moreover, embodiments of the present invention may be also implemented by providing a system or a device with a recoding medium storing program codes of software that realizes functions of the above embodiments and by causing the computer (or CPU, MPU, or the like) of the system or the device to read out and to execute the program codes stored in the recoding medium.

In this case, the program codes itself, which is read out from the recoding medium, realize the functions of the above embodiments, and the program codes and the recoding medium storing the program codes constitute the present invention.

Further, as a recoding medium for providing program codes, for example, a floppy disk (registered trademark), a hard disk, a magneto-optical disk, an optical disk such as a CD-ROM, a CD-R, a CD-RW, a DVD-ROM, a DVD-RAM, a DVD-RW, and a DVD+RW, a magnetic tape, a nonvolatile memory card, a ROM, and the like may be used. Alternatively, program codes may be downloaded via a network.

Furthermore, the functions of the above embodiments may be realized not only by executing program codes read out by a computer, but also by causing, based on instructions of such program codes, an operating system (OS) running on the computer, or the like, to perform a part or whole parts of actual processing.

Moreover, the functions of the above embodiments may be realized, after program codes read out from a recoding medium are written into a memory provided on an extension board inserted into a computer or which is provided in an extension unit connected to a computer, by causing, based on instructions of such program codes, a CPU or the like provided on the extension board or in the extension unit to perform a part or whole parts of actual processing.

It should be understood by those skilled in the art that various modifications, combinations, sub-combinations and alterations may occur depending on design requirements and other factors insofar as they are within the scope of the appended claims or the equivalents thereof.

What is claimed is:

1. A data transmission device, comprising:
   an acquisition unit which acquires identification information indicating whether or not a data reception device operating by a first digital interface is compatible with a second digital interface other than the first digital interface, the identification information being stored in a storing unit of the data reception device and being acquired via the first digital interface of the data reception device and via the second digital interface of the data transmission device operating by the second digital interface; and
   a distinction unit which distinguishes whether the data reception device is compatible with the second digital interface based on the identification information acquired by the acquisition unit,
   wherein the identification information is Enhanced Extended Display Identification Data (E-EDID) stored in the storing unit,
   the distinction unit (i) distinguishes whether the Enhanced Extended Display Identification Data (E-EDID) is an EDID Data Block Header Byte, (ii) in response to the Enhanced Extended Display Identification Data (E-EDID) being the EDID Data Block Header Byte, distinguishes whether a tag code of a Vendor Specific Data Block (VSDB) described in the EDID Data Block Header Byte is a predetermined value, and (iii) in response to the tag code of the Vendor Specific Data Block (VSDB) being the predetermined value, distinguishes whether the data reception device is compatible with the second digital interface based on a Registration Identifier contained in the Vendor Specific Data Block (VSDB), and
   the data transmission device transmits differential signals unidirectionally to the data reception device on a single channel during at least one of a horizontal blanking interval or a vertical blanking interval and transmits TMDS clocks inserted into the single channel in a common mode, such that the differential signals and the TMDS clocks are transmitted on the same single channel.

2. The data transmission device according to claim 1, wherein the first digital interface is an interface according to High Definition Multimedia Interface (HDMI) standard, and wherein the second digital interface is an interface according to Mobile High-definition Link (MHL) standard.

3. The data transmission device according to claim 2, wherein the data transmission device transmits further differential signals related to pixel data constituting an uncompressed image for one frame, unidirectionally to the data reception device on the single channel during an active video interval.

4. The data transmission device according to claim 2, wherein the data transmission device transmits differential signals related to at least one of voice data associated with an image, control data, or auxiliary data, unidirectionally to the data reception device on the single channel during the at least one of a horizontal blanking interval or a vertical blanking interval.

5. A data reception device, comprising
   a storing unit which stores identification information indicating whether or not the data reception device operating by a first digital interface is compatible with a second digital interface other than the first interface, the identification information being acquired by a data transmission device operating by the second digital interface via the first digital interface and via the second interface,
   wherein the identification information is Enhanced Extended Display Identification Data (E-EDID) stored in the storing unit,
   the data transmission device (i) distinguishes whether the Enhanced Extended Display Identification Data (E-EDID) is an EDID Data Block Header Byte, (ii) in response to the Enhanced Extended Display Identification Data (E-EDID) being the EDID Data Block Header Byte, distinguishes whether a tag code of a Vendor Specific Data Block (VSDB) described in the EDID Data Block Header Byte is a predetermined value, and (iii) in response to the tag code of the Vendor Specific Data Block (VSDB) being the predetermined value, distinguishes whether the data reception device is compatible with the second digital interface based on a Registration Identifier contained in the Vendor Specific Data Block (VSDB), and
   the data reception device receives differential signals transmitted unidirectionally to the data reception device on a single channel during at least one of a horizontal blanking interval or a vertical blanking interval and receives TMDS clocks inserted into the single channel in a common mode, such that the differential signals and the TMDS clocks are received on the same single channel.

6. The data reception device according to claim 5, wherein the first digital interface is an interface according to High Definition Multimedia Interface (HDMI) standard, and wherein the second digital interface is an interface according to Mobile High-definition Link (MHL) standard.

7. A data transmission method, comprising:
   acquiring identification information indicating whether a data reception device operating by a first digital interface is compatible with a second digital interface other than the first digital interface, the identification information being stored in a storing unit of the data reception device and being acquired via the first digital interface of the data reception device and via the second digital interface of a data transmission device operating by the second digital interface; and
   distinguishing whether the data reception device is compatible with the second digital interface, based on the identification information acquired in the step of acquiring,
   wherein the identification information is Enhanced Extended Display Identification Data (E-EDID) stored in the storing unit,
   the distinguishing step (i) distinguishes whether the Enhanced Extended Display Identification Data (E-EDID) is an EDID Data Block Header Byte, (ii) in response to the Enhanced Extended Display Identification Data (E-EDID) being the EDID Data Block Header Byte, distinguishes whether a tag code of a Vendor Specific Data Block (VSDB) described in the EDID Data Block Header Byte is a predetermined value, and (iii) in response to the tag code of the Vendor Specific Data Block (VSDB) being the predetermined value, distinguishes whether the data reception device is compatible with the second digital interface based on a Registration Identifier contained in the Vendor Specific Data Block (VSDB), and differential signals are transmitted unidirectionally to the data reception device on a single channel during at least one of a horizontal blanking interval or a vertical blanking interval and TMDS clocks are inserted into the single channel in a common mode and transmitted, such that the differential signals and the TMDS clocks are transmitted on the same single channel.

8. A data reception method, comprising:

causing a storing unit of a data reception device operating by a first digital interface to store identification information indicating whether or not the data reception device is compatible with a second digital interface other than the first interface, the identification information being acquired by a data transmission device operating by the second digital interface via the first digital interface and via the second digital interface, wherein the identification information is Enhanced Extended Display Identification Data (E-EDID) stored in the storing unit, the data transmission device (i) distinguishes whether the Enhanced Extended Display Identification Data (E-EDID) is an EDID Data Block Header Byte, (ii) in response to the Enhanced Extended Display Identification Data (E-EDID) being the EDID Data Block Header Byte, distinguishes whether tag code of a Vendor Specific Data Block (VSDB) described in the EDID Data Block Header Byte is a predetermined value, and (iii) in response to the tag code of the Vendor Specific Data Block (VSDB) being the predetermined value, distinguishes whether the data reception device is compatible with the second digital interface based on a Registration Identifier contained in the Vendor Specific Data Block (VSDB), and differential signals are transmitted unidirectionally to the data reception device on a single channel during at least one of a horizontal blanking interval or a vertical blanking interval and TMDS clocks are inserted into the single channel in a common mode and transmitted, such that the differential signals and the TMDS clocks are transmitted on the same single channel.

* * * * *